United States Patent
Butler et al.

(10) Patent No.: US 6,469,920 B2
(45) Date of Patent: Oct. 22, 2002

(54) INDUCTORLESS VARIABLE VOLTAGE APPLIANCE POWER SUPPLY

(75) Inventors: Richard George Arthur Butler, Dunedin (NZ); Graeme Colin Fuller, South Dunedin (NZ)

(73) Assignee: Fisher & Paykel Limited, Auckland (NZ)

( * ) Notice: Subject to any disclaimer, the term of this patent is extended or adjusted under 35 U.S.C. 154(b) by 0 days.

(21) Appl. No.: 09/829,036

(22) Filed: Apr. 9, 2001

(65) Prior Publication Data

US 2001/0050854 A1 Dec. 13, 2001

(30) Foreign Application Priority Data

Apr. 10, 2000 (NZ) .................................... 510753

(51) Int. Cl.[7] ............................................. H02M 5/42
(52) U.S. Cl. ................................................... 363/89
(58) Field of Search ........................ 318/249; 392/311; 134/105; 363/89, 78

(56) References Cited

U.S. PATENT DOCUMENTS 3,585,476 A * 6/1971 Rutchik ....................... 318/249
4,801,887 A * 1/1989 Wegener ...................... 327/104

FOREIGN PATENT DOCUMENTS

| JP | 7246352 | 9/1995 |
| JP | 9084694 | 9/1995 |

* cited by examiner

*Primary Examiner*—Shawn Riley
(74) *Attorney, Agent, or Firm*—Trexler, Bushnell, Giangiorgi, Blackstone & Marr, Ltd.

(57) ABSTRACT

A transformerless non-switched mode power supply for use with whiteware appliances having a water heating element. A high power voltage dropping resistor is used in series with a rectifier and a switching device phase controls the mains half waves to produce a variable voltage direct current supply for an appliance motor. The voltage dropping resistor is formed by the water heater element and the DC supply voltage is controlled by the appliance controller to vary the motor torque as required.

9 Claims, 1 Drawing Sheet

| XD | Zero crossing detector |
| C3 | Reservoir Capacitor |
| µP₁ | Microprocessor |

US 6,469,920 B2

INDUCTORLESS VARIABLE VOLTAGE APPLIANCE POWER SUPPLY

FIELD OF THE INVENTION

This invention relates to DC power supplies and in particular, but not solely, power supplies for whiteware appliances.

PRIOR ART

Modern whiteware appliances commonly use switched mode power supplies to supply power to motors, solenoids and control electronics. Such power supplies consume power even when on standby (a condition which the user considers as being switched off). Further, switched mode power supplies require the use of relatively expensive components such as inductors and capacitors having a high working voltage. In such whiteware appliances it is common to control motor torque and speed using pulse width modulation (PWM) techniques to control current supplied to the motor windings. Such PWM circuits also require relatively expensive components.

SUMMARY OF THE INVENTION

It is an object of the present invention to provide a power supply which goes at least some way towards overcoming the abovementioned disadvantages.

Briefly and in accordance with the foregoing, a variably controlled output voltage DC power supply is provided and is particularly suited for use in whiteware appliances having built-in heater elements. The power supply has a standby mode and includes a rectifier, a reservoir capacitor, a semiconductor switching device, a voltage dropping resistor and a microprocessor. The rectifier receives AC from a mains supply. In use, the reservoir capacitor provides the DC output of the power supply. The semiconductor switching device is in series with the reservoir capacitor and controls current flow from the output of the rectifier to the reservoir capacitor. The voltage dropping resistor is connected in series with the rectifier which when the supply is in the ON mode and reduces the peak unidirectional voltage provided from the rectifier to a level compatible with the DC output voltage of the supply. The microprocessor variably controls the conduction angle of the switching device to vary the DC voltage across the reservoir capacitor to a desired value.

DESCRIPTION OF THE PREFERRED EMBODIMENT

Figure 1:
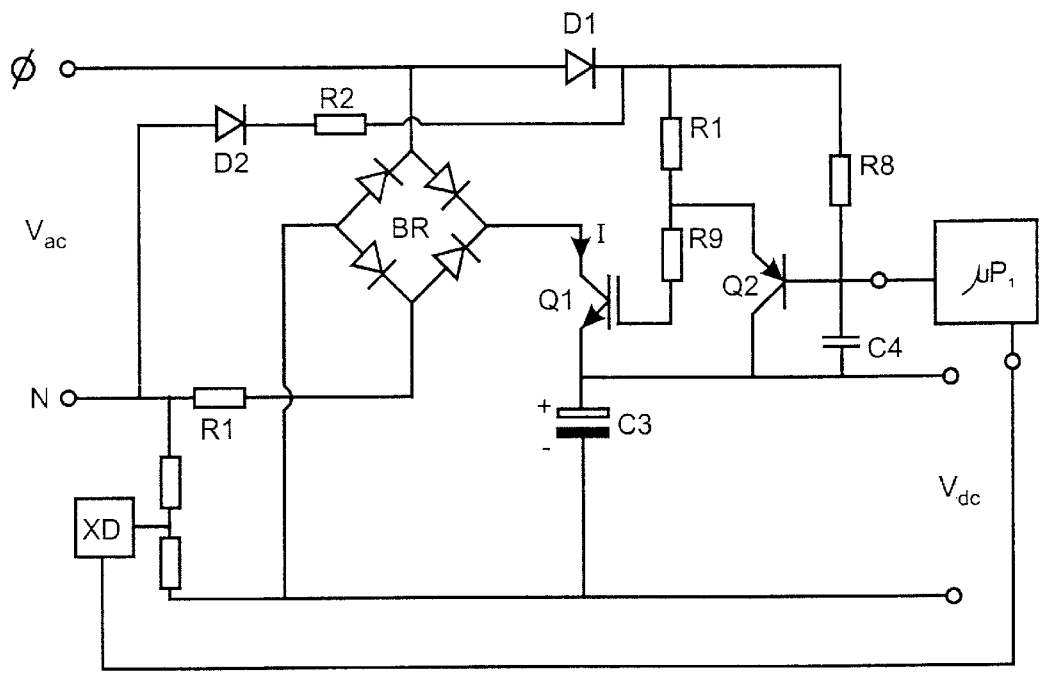
FIG. 1 is a circuit diagram of a dc power supply particularly suited to whiteware appliances such as dishwashers.

The power supply of the present invention is particularly suited for use in whiteware appliances having built-in heater elements such as dishwashers and washing machines and such an embodiment will now be described A simplified circuit diagram of the power supply of the present invention is shown in FIG. 1. This power supply is a transformerless design which uses a high power voltage dropping resistor R1 and phase control of mains halfwaves to provide a variable voltage direct current rail having a voltage $V_{de}$, which can be varied under microprocessor control in the range 30 volts to 85 volts. Typically the variable voltage output would be used to control an appliance motor and voltage dropping resistor R1, which dissipates significant power, would form the water heating element.

The use of a power dissipating voltage dropping resistor, such as R1 in the present invention, would for many power supply applications be considered unacceptable, but for home appliances incorporating water heating the power dissipated from such a resistor can be put to good use as a water heating element. Thus in such applications this normally disadvantageous circuit feature can be converted to an advantage.

Referring to FIG. 1 the AC mains supply voltage $V_{ac}$, which may be 230/240volts or 110 volts, is fed to a fill wave bridge rectifier BR via a voltage dropping resistor in R1 in series with the neutral conductor. Bearing in mind the maximum DC voltage to be supplied by the power supply is typically 85 volts the value of R1 must differ depending on the nominal mains voltage. For a 50 Hz 230 volt mains supply and an output of 85 volts with the maximum current of 1 amp the value of R1 is 129 ohms. For a 110 volt 60 Hz supply the value of R1 is 29 ohms.

Figure 2:
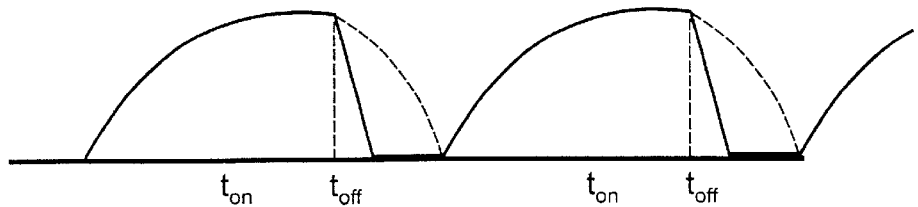
FIG. 2 is a waveform diagram of current through a semiconductor device in the power supply.

A large value reservoir capacitor C3 is charged from bridge rectifier BR to provide the variable voltage DC power. The value of the output voltage is determined by phase switching of transistor $Q_1$ which is an insulated gate bipolar transistor (IGBT). The conduction angle of $Q_1$ is controlled by a microprocessor $\mu P_1$ for the purpose of determining appliance motor torque at various stages of a wash cycle. Conduction angle control of $Q_1$ is indicated by the waveform diagram in FIG. 2 which shows collector current 1. The value of conduction angle $t_{on}$ is increased or decreased to in turn increase or decrease the output voltage $V_{de}$.

It has been determined that a suitable value for reservoir capacitor C3 is 1000 $\mu$F. This will give a ripple voltage of between 3 and 4 volts and the capacitor will require a ripple current rating of at least 1 amp. The use of voltage dropping resistor R1 means that the DC voltage rating of capacitor C3 can be relatively modest, namely 100 volts.

To minimise radio frequency interference during switching of $Q_1$ it is necessary to control the turnoff time $t_{off}$ to reduce the rate of change of current dI/dt. For triac phase control it would be necessary to use induces typically of the value from 2 to 5 mH. With the present power supply circuit the use of such inductances can be avoided by utilising the Miller effect. The gate resistance of IGBT $Q_1$ in conjunction with the Miller capacitance provides an approximately linear fall in voltage with respect to time. The gate charge of $Q_1$ is discharged at a rate determined by the gate voltage and the gate resistor R9.

The bias current for $Q_1$ must be obtained directly from the AC mains to ensure there will be sufficient voltage difference relative to the collector of $Q_1$ from which to derive supply during positive mains half cycles. The bias supply is a half wave supply provided by diode D1 and capacitor C4.

The bias supply for $Q_1$ must meet two onerous requirements. First it must ensure proper operation at both 110 and 230 volt mains supplies. Second it must ensure fast start-up on power on to ensure $Q_1$ does not operate in a potentially destructive linear mode. If $Q_1$ is either off or in a linear mode during a negative half cycle then there will be a voltage difference between the collector and gate producing a current to the bias supply via diode D2. Resistor R8 acts to isolate capacitor C4 which would otherwise prevent any instantaneous gate drive. Resistor R2 serves to protect diodes D1 and D2 during transient mains spikes which could cause reverse breakdown on either diode.

Microprocessor $\mu P_1$ which will usually be the same device that forms the appliance controller, controls the output voltage of the power supply by controlling $Q_1$ through transistor $Q_2$. The microprocessor requires time pulses so as to synchronise with the mains half cycles. A zero crossing detector circuit XD provides these timing signals.

The power supply of the present invention provides a number of advantages in applications where the power dissipated in voltage dropping resistor R1 can be put to good use. These include the absence of inductors, the avoidance of the need for a PWM circuit for motor control, low voltage rating for the reservoir capacitor, reduced radio frequency interference and reduced power consumption when the appliance is on standby. Further, the value of only one component needs to be changed as between a power supply for 110 volt mains and a power supply for 230 volt mains. This is the value of the dropping resistor which, as already explained, is implemented by the appliance water heating element.

In FIG. 1 dropping resistor R1 is shown located between the mains supply and the bridge rectifier, but it may be located on the DC side of the bridge rectifier.

In conjunction with the reduction of power when on standby the present circuit has the advantage over conventional switch mode controlled power supplies in that it is unnecessary to use a separate standby power supply.

In most appliances one or more fixed voltage dc power supplies will also be required and these can be derived from the present variable voltage dc supply by the use of pulse width modulator supplies to provide voltages at values such as 5 volts and 24 volts.

What is claimed is:

1. A variably controlled output voltage DC power supply having a standby mode comprising:

a rectifier means, which received AC from a mains supply, a reservoir capacitor which in use provides the DC output of said power supply, a semiconductor switching device in series with said reservoir capacitor which controls current flow from the output of said rectifier means to said reservoir capacitor, a voltage dropping resistor connected in series with said rectifier means which when said supply is in the ON mode reduces the peak unidirectional voltage provided from the rectifier means to a level compatible with the DC output voltage of said supply, and means for variably controlling the conduction angle of said switching device to vary the DC voltage across said reservoir capacitor to a desired value.

2. A power supply according to claim 1 wherein said voltage dropping resistor is connected in series with the input of said rectifier means.

3. A power supply according to claim 1 wherein said voltage dropping resistor is connected in series with the output of said rectifier means.

4. A power supply according to claim 1 wherein said power supply supplies power to a motor in a home appliance which uses hot water and said voltage dropping resistor is a heating element for heating said water.

5. A power supply according to claim 4 wherein said means for variably controlling the conduction angle of said semiconductor switching device is a microprocessor.

6. A washing appliance having a motor and a water heater element, said motor being powered by a DC power supply having an ON mode and a standby mode comprising:

a rectifier means, which receives AC form a mains supply, a reservoir capacitor which in use provides DC to said motor, a semiconductor switching device in series with said reservoir capacitor which controls current flow from the output of said rectifier means to said reservoir capacitor, said heating element connected in series with said rectifier means which when said supply is in the ON mode reduces the peak unidirectional voltage provided from the rectifier means to a level compatible with the maximum DC output voltage of said supply, and means for variably controlling the conduction angle of said switching device to vary the DC voltage across said reservoir capacitor to a desired value.

7. A washing appliance according to claim 6 wherein said voltage dropping resistor is connected in series with the input of said rectifier means.

8. A washing appliance according to claim 6 wherein said voltage dropping resistor is connected in series with the output of said rectifier means.

9. A washing appliance according to claim 6 including a wash cycle controller and wherein said means for variably controlling the conduction angle of said semiconductor switching means is said controller.

* * * * *

UNITED STATES PATENT AND TRADEMARK OFFICE
CERTIFICATE OF CORRECTION

PATENT NO. : 6,469,920 B2  
DATED : October 22, 2002  
INVENTOR(S) : Richard George Arthur Butler and Graeme Colin Fuller It is certified that error appears in the above-identified patent and that said Letters Patent is hereby corrected as shown below:

Column 2,  
Line 1, "$V_{de}$," should be -- $V_{dc}$ --  
Line 16, "fill" should be -- full --  
Line 36, "$V_{de}$," should be -- $V_{dc}$ --  
Line 47, "induces" should be -- inductantes --

Column 3,  
Line 32, "dc" should be -- DC --

Signed and Sealed this

Twenty-ninth Day of April, 2003

JAMES E. ROGAN  
*Director of the United States Patent and Trademark Office*